United States Patent
Schowengerdt et al.

(10) Patent No.: US 12,493,192 B2
(45) Date of Patent: Dec. 9, 2025

(54) WEARABLE DISPLAY DEVICE UTILIZING A COMPOSITE FIELD OF VIEW

(71) Applicant: Magic Leap, Inc., Plantation, FL (US)

(72) Inventors: Brian T. Schowengerdt, Seattle, WA (US); Ivan Li-Chuen Yeoh, Wesley Chapel, FL (US); Lionel Ernest Edwin, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 79 days.

(21) Appl. No.: 17/945,748

(22) Filed: Sep. 15, 2022

(65) Prior Publication Data

US 2023/0013334 A1 Jan. 19, 2023

Related U.S. Application Data

(63) Continuation of application No. 15/933,298, filed on Mar. 22, 2018, now Pat. No. 11,474,362.
(Continued)

(51) Int. Cl.
*G02B 27/02* (2006.01)
*G02B 27/00* (2006.01)
(Continued)

(52) U.S. Cl.
CPC ....... *G02B 27/026* (2013.01); *G02B 27/0081* (2013.01); *G02B 27/0172* (2013.01);
(Continued)

(58) Field of Classification Search
None
See application file for complete search history.

(56) References Cited

U.S. PATENT DOCUMENTS 8,233,204 B1 7/2012 Robbins et al.
8,314,993 B2 11/2012 Levola
(Continued)

FOREIGN PATENT DOCUMENTS

CN 101460884 6/2009
CN 101945612 A 1/2011
(Continued)

OTHER PUBLICATIONS

Application No. AU2018240363 , "Notice of Acceptance", Feb. 10, 2023, 3 pages.
(Continued)

*Primary Examiner* — Christopher Stanford
(74) *Attorney, Agent, or Firm* — KILPATRICK TOWNSEND & STOCKTON LLP

(57) ABSTRACT

A wearable display device suitable for use in an augmented reality environment is disclosed. The wearable display device can include a projector configured to project light through diffractive optical elements that then distributed the light to multiple display regions. Each of the display regions can be arranged to project light out of the wearable display device towards an eye of a user. Since each of the display regions are positioned in different locations with respect to an eye of a user, the result is that each display region directs light in a different direction. In this way the apparent field of view for a user of the wearable display can be substantially increased.

14 Claims, 13 Drawing Sheets

Related U.S. Application Data

(60) Provisional application No. 62/475,087, filed on Mar. 22, 2017.

(51) Int. Cl.
   *G02B 27/01* (2006.01)
   *G02B 27/18* (2006.01)
   *G02B 27/42* (2006.01)
   *G06T 19/00* (2011.01)

(52) U.S. Cl.
   CPC ............ *G02B 27/18* (2013.01); *G02B 27/42* (2013.01); *G02B 27/4272* (2013.01); *G02B 2027/0123* (2013.01); *G06T 19/006* (2013.01)

(56) References Cited

U.S. PATENT DOCUMENTS

| | | | |
|---|---|---|---|
| 8,494,229 | B2 | 7/2013 | Jarvenpaa et al. |
| 8,736,963 | B2 | 5/2014 | Robbins et al. |
| 8,903,207 | B1 | 12/2014 | Brown et al. |
| 9,128,226 | B2 | 9/2015 | Fattal et al. |
| 9,164,283 | B2 * | 10/2015 | Chiang .............. G02B 27/0172 |
| 9,372,347 | B1 | 6/2016 | Levola et al. |
| 9,933,621 | B2 * | 4/2018 | Hirano .............. G02B 27/0176 |
| 10,191,288 | B2 | 1/2019 | Singer et al. |
| 10,393,941 | B2 * | 8/2019 | Nichol ................ G02B 6/0018 |
| 10,520,733 | B2 | 12/2019 | Takeda et al. |
| 11,474,362 | B2 | 10/2022 | Schowengerdt et al. |
| 2008/0198471 | A1 | 8/2008 | Amitai |
| 2009/0128902 | A1 | 5/2009 | Niv et al. |
| 2009/0128911 | A1 | 5/2009 | Itzkovitch et al. |
| 2010/0149073 | A1 | 6/2010 | Chaum et al. |
| 2010/0231693 | A1 | 9/2010 | Levola |
| 2010/0277803 | A1 | 11/2010 | Pockett et al. |
| 2010/0296163 | A1 | 11/2010 | Saarikko |
| 2011/0019874 | A1 | 1/2011 | Jarvenpaa et al. |
| 2012/0300311 | A1 | 11/2012 | Simmonds et al. |
| 2013/0051730 | A1 | 2/2013 | Travers et al. |
| 2013/0063815 | A1 | 3/2013 | Kubota |
| 2014/0218801 | A1 | 8/2014 | Simmonds et al. |
| 2014/0362447 | A1 | 12/2014 | Simmonds et al. |
| 2015/0289762 | A1 | 10/2015 | Popovich et al. |
| 2015/0355461 | A1 | 12/2015 | Kessler et al. |
| 2015/0378161 | A1 | 12/2015 | Bailey et al. |
| 2016/0116979 | A1 | 4/2016 | Border |
| 2016/0154150 | A1 | 6/2016 | Simmonds et al. |
| 2016/0195720 | A1 | 7/2016 | Travis et al. |
| 2016/0231567 | A1 | 8/2016 | Saarikko et al. |
| 2016/0231568 | A1 | 8/2016 | Saarikko et al. |
| 2016/0238845 | A1 | 8/2016 | Alexander et al. |
| 2017/0003505 | A1 | 1/2017 | Vallius et al. |
| 2017/0059879 | A1 | 3/2017 | Vallius |
| 2018/0095283 | A1 | 4/2018 | Takeda et al. |
| 2018/0180817 | A1 | 6/2018 | Yeoh et al. |
| 2018/0188542 | A1 | 7/2018 | Waldern et al. |
| 2018/0267605 | A1 | 9/2018 | Border |
| 2019/0101760 | A1 | 4/2019 | Ayres et al. |

FOREIGN PATENT DOCUMENTS

| | | |
|---|---|---|
| CN | 103688208 A | 3/2014 |
| CN | 104508353 A | 4/2015 |
| CN | 106489177 | 3/2017 |
| CN | 107820578 A | 3/2018 |
| JP | 2009539129 | 11/2009 |
| KR | 20170012370 A | 2/2017 |
| WO | 2007141588 | 12/2007 |
| WO | 2007141606 | 12/2007 |
| WO | 2009101238 | 8/2009 |

OTHER PUBLICATIONS

Application No. EP18771557.8 , "Office Action", Jan. 20, 2023, 5 pages.
Application No. KR10-2019-7030860 , "Office Action" and English translation, Feb. 7, 2023, 27 pages.
Application No. NZ757402 , "First Examination Report", Mar. 28, 2023, 2 pages.
U.S. Appl. No. 15/933,298, Advisory Action mailed on Sep. 1, 2020, 3 pages.
U.S. Appl. No. 15/933,298, Advisory Action mailed on Jul. 26, 2021, 4 pages.
U.S. Appl. No. 15/933,298, Final Office Action mailed on May 12, 2021, 12 pages.
U.S. Appl. No. 15/933,298, Final Office Action mailed on May 20, 2020, 12 pages.
U.S. Appl. No. 15/933,298, Final Office Action mailed on Mar. 4, 2022, 15 pages.
U.S. Appl. No. 15/933,298, Non-Final Office Action mailed on Dec. 20, 2019, 11 pages.
U.S. Appl. No. 15/933,298, Non-Final Office Action mailed on Jan. 22, 2021, 11 pages.
U.S. Appl. No. 15/933,298, Non-Final Office Action mailed on Sep. 24, 2021, 12 pages.
U.S. Appl. No. 15/933,298, Notice of Allowance mailed on Jun. 16, 2022, 8 pages.
Australian Application No. 2018240363, First Examination Report mailed on Apr. 13, 2022, 4 pages.
Australian Application No. 2018240363, Second Examination Report mailed on Oct. 25, 2022, 3 pages.
Chinese Application No. 201880019276.0, Notice of Decision to Grant mailed on Aug. 11, 2022, 3 pages (1 page of Original Document and 2 pages of English Translation).
Chinese Application No. 201880019276.0, Office Action mailed on Jun. 2, 2021, 15 pages (9 pages of Original Document and 6 pages of English Translation).
Chinese Application No. 201880019276.0, Office Action mailed on Feb. 7, 2022, 6 pages (4 pages of Original Document and 2 pages of English Translation).
European Application No. 18771557.8, Extended European Search Report mailed on Mar. 17, 2020, 9 pages.
Israel Application No. 269389, Office Action mailed on Aug. 22, 2022, 3 pages.
Indian Application No. 201947036130, First Examination Report mailed on Feb. 2, 2022, 7 pages.
Japanese Application No. 2019-551593, Office Action mailed on Feb. 25, 2022, 7 pages (2 pages of Original Document and 5 pages of English Translation).
International Application No. PCT/US2018/023842, International Preliminary Report on Patentability mailed on Oct. 3, 2019, 9 pages.
International Application No. PCT/US2018/023842, International Search Report and Written Opinion mailed on Jun. 25, 2018, 10 pages.
Japanese Patent Application No. 2022-123247, "Office Action" and English translation, Jun. 16, 2023, 6 pages.
Korean Patent Application No. 10-2019-7030860, "Notice of Decision to Grant" and English translation, Aug. 23, 2023, 4 pages.
Application No. CA3056921 , "Office Action", Apr. 3, 2023, 3 pages.
JP2022-123247, "Notice of Allowance", Oct. 31, 2023, 3 pages. [no translation available].
KR10-2023-7040169, "Office Action" and English translation, Dec. 5, 2023, 5 pages.
CN202211288289.2, "Office Action", Mar. 27, 2024, 12 pages. [no translation available].

* cited by examiner

WEARABLE DISPLAY DEVICE UTILIZING A COMPOSITE FIELD OF VIEW

CROSS-REFERENCES TO RELATED APPLICATIONS

This application is a continuation of U.S. patent application Ser. No. 15/933,298, filed Mar. 22, 2018, U.S. Pat. No. 11,474,362, issued Oct. 18, 2022, entitled "WEARABLE DISPLAY DEVICE UTILIZING A COMPOSITE FIELD OF VIEW," which is a non-provisional of and claims the benefit of and priority to U.S. Provisional Patent Application No. 62/475,087, filed Mar. 22, 2017, entitled "WEARABLE DISPLAY DEVICE UTILIZING A COMPOSITE FIELD OF VIEW," which are hereby incorporated by reference in their entirety for all purposes.

BACKGROUND OF THE INVENTION

Wearable display devices often include eyepieces that project an image field into the eyes of a user in a substantially uniform direction. One reason this practice has been continued in the manufacture of wearable display devices is that decoupling optics of diffractive waveguides generally are limited on account of the image field emitted by the decoupling optics being oriented in one direction, resulting in a limited field of view in display applications. While decoupling the image field in this manner makes for a simple design, the close proximity of these eyepieces to the eyes of a user often limits the size of a field of view displayable by the wearable display device. While certain display variations such as increasing the service angle of pixels of the display can ameliorate these issues to a certain extent, these changes often result in a need for additional power and may not even be technologically feasible for certain display designs. Given that wearable devices are generally battery powered, higher power outputs can substantially reduce the amount of usable operating time of the wearable device.

SUMMARY OF THE INVENTION

This disclosure relates generally to method and apparatus for expanding a user's effective field of view when using a wearable display device.

The effective field of view of the wearable device can be expanded by orienting light from different display regions associated with an eyepiece in different directions so that light output from each display region of the eyepiece is oriented generally towards the eye of a user. In this way, light being emitted by portions of the display region located in the user's peripheral field of view can reach an eye of the user. In some embodiments, larger numbers of display regions can be used to further increase the effective field of view. The larger number of display regions is helpful in configurations where each display region is limited to emitting an image field oriented in one direction. For example, a display region occupying only a far peripheral region of a user's field of view could be more precisely directed towards the eye of the user than a display region occupying both near and far peripheral regions of the user's field of view. Embodiments utilizing greater numbers of display regions can also utilize larger numbers of light sources, such as projectors, to support the larger numbers of display regions.

A wearable display device is disclosed that includes the following: a projector; a waveguide system, comprising optical elements that define: a first optical pathway having a first input region configured to redirect light received from the projector towards a user at a first angle, and a second optical pathway having a second input region adjacent to the first input region and configured to redirect light received from the projector towards the user at a second angle different from the first angle.

Another wearable display device is described that includes the following: a projector; and a waveguide system. The waveguide system includes: an input coupling grating having first and second input regions configured to receive light from the projector, first and second orthogonal pupil expanders configured to transmit light received from a corresponding one of the first input region and the second input region, and first and second exit pupil expanders configured to receive light from a corresponding one of the orthogonal pupil expanders and redirect the light towards a user. The second exit pupil expander is configured to decouple light from the waveguide system at a different angle than the first exit pupil expander.

Another wearable display device is described that includes the following: a projector; and a diffractive waveguide system including optical elements that define: a first optical pathway; and a second optical pathway separate and distinct from the first optical pathway. The first and second optical pathways are configured to receive light from the projector. The first optical pathway is configured to decouple a first portion of the light received from the projector toward a user at a first angle and the second optical pathway is configured to decouple a second portion of the light from the projector toward the user at a second angle different than the first angle.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF THE INVENTION

Figure 1:
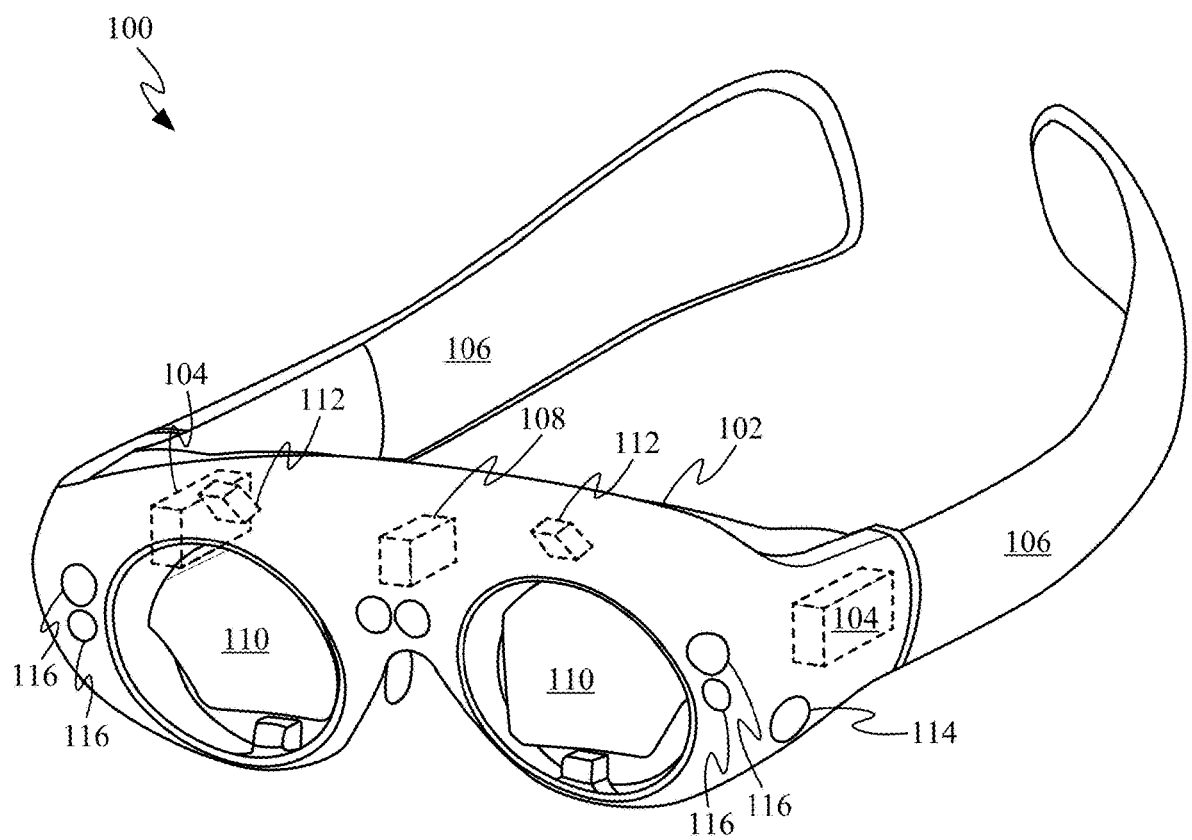
FIG. 1 shows a perspective view of an exemplary wearable device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

Conventional displays such as wall-mounted displays are often designed so as to be viewable from multiple different angles. In this way, content may be presented to users positioned at multiple different locations within the vicinity of such a display. In order to accomplish this, each pixel location of a display is often required to spread the light it emits across a large service angle so that a user viewing the display is able to enjoy a consistent view of the display from multiple different positions. Unfortunately, maintaining a desired picture brightness for a display having pixels with large service angles generally requires more energy than a display with pixels having small service angles. While a large service angle configuration could work well for a large stationary display plugged into a wall outlet, this configuration might not be ideal for a mobile display device dependent on battery power.

On the other hand, wearable display devices, such as those described herein in association with embodiments of the present invention, may serve to present content to a single user whose position is generally known. For this reason, such wearable display devices need not include some of the inefficient elements reflected in the designs of wall-mounted displays and other display devices that are intended to provide consistent picture quality across a large spectrum of viewing positions. For example, the service angle for each pixel can be substantially reduced and the light output aligned with the expected position of the eyes of the user. As described in further detail below, one way to accomplish this is to segment each eyepiece of the wearable display into multiple display regions, so that the display regions cooperatively generate a composite image or image stream. Each display region can then be configured to decouple a portion of the image or image stream associated orient light towards the expected position of a user's eyes.

In some embodiments, the wearable display device includes diffractive optical elements that are configured to direct light from a projector into the eyes of a user of the wearable device. Light received by the diffractive optical elements can be distributed to multiple optical pathways, each one of the pathways corresponding to one of the respective display regions. Each of the optical pathways can be defined by an input coupling grating configured to receive the projected light an orthogonal pupil expander configured to distribute the light to one or more exit pupil expanders and the exit pupil expanders, which are configured to decouple the light towards an eye of the user.

In some embodiments, a single input coupling grating can be subdivided into multiple input regions so light received by the input coupling grating can be distributed to multiple display regions. The input coupling grating can divide the light received from the projector in multiple ways. In some embodiments, different regions of the input coupling grating can correspond to different display regions of the wearable device. Light blocking elements can be positioned within the input coupling grating to prevent cross-talk between adjacent regions of the input coupling grating. In some embodiments, the projector can be configured to change a characteristic of the projected light in accordance with a particular optical pathway. For example, different portions of the projected light can have different polarizations. In some embodiments, a first polarization would result in light entering the input coupling grating travelling in a first direction and a second polarization would cause light entering the input coupling grating to travel in a second direction different from the first direction. Examples of polarization-sensitive input coupling elements (e.g., cholesteric liquid crystal gratings) and waveguide system architectures with polarization-sensitive input coupling elements optically coupled thereto are described in further detail in U.S. patent application Ser. No. 15/902,927, filed Feb. 22, 2018, which is incorporated by reference herein in its entirety. It follows that, in at least some examples, one or more of the systems and techniques described herein may make use of such polarization-sensitive input coupling elements and waveguide system architectures so as to selectively route light to different eyepiece components on the basis of polarization. Alternatively, the projector could adjust the wavelength of the light causing light within a first set of wavelength ranges to travel down one optical path and a second set of wavelength ranges to travel down another optical pathway. In some embodiments, properties built into each optical pathway of the waveguide could prevent light that inadvertently entered the wrong optical pathway from being outcoupled towards the user.

These and other embodiments are discussed below with reference to FIGS. 1-7 however, those skilled in the art will readily appreciate that the detailed description given herein with respect to these figures is for explanatory purposes only and should not be construed as limiting.

FIG. 1 shows a perspective view of a wearable device 100. Wearable device 100 includes a frame 102 configured to support one or more projectors at various positions along an interior-facing surface of frame 102, as indicated by the dashed boxes. In some embodiments, projectors can be attached at positions 104 near temples 106. Alternatively, or in addition another projector could be placed in position 108. Such projectors may, for instance, include or operate in conjunction with one or more liquid crystal on silicon (LCoS) modules or fiber scanning devices. In some embodiments, light from projectors disposed in positions 104 and 108 could be guided into eyepieces 110 for display to eyes of a user. Projectors placed at positions 112 can be somewhat smaller on account of the close proximity this gives the projectors to the waveguide system. The closer proximity can reduce the amount of light lost as the waveguide system guides light from the projectors to eyepieces 110. In some embodiments, the projectors at positions 112 can be utilized in conjunction with projectors disposed at positions 108 or 104. While not depicted, in some embodiments, projectors could also be located at positions beneath eyepieces 110. Wearable device 100 is also depicted including sensors 114 and 116. Sensors 114 and 116 can take the form of forward-facing and lateral-facing optical sensors configured to characterize the real-world environment surrounding wearable device 100.

Figure 2A:
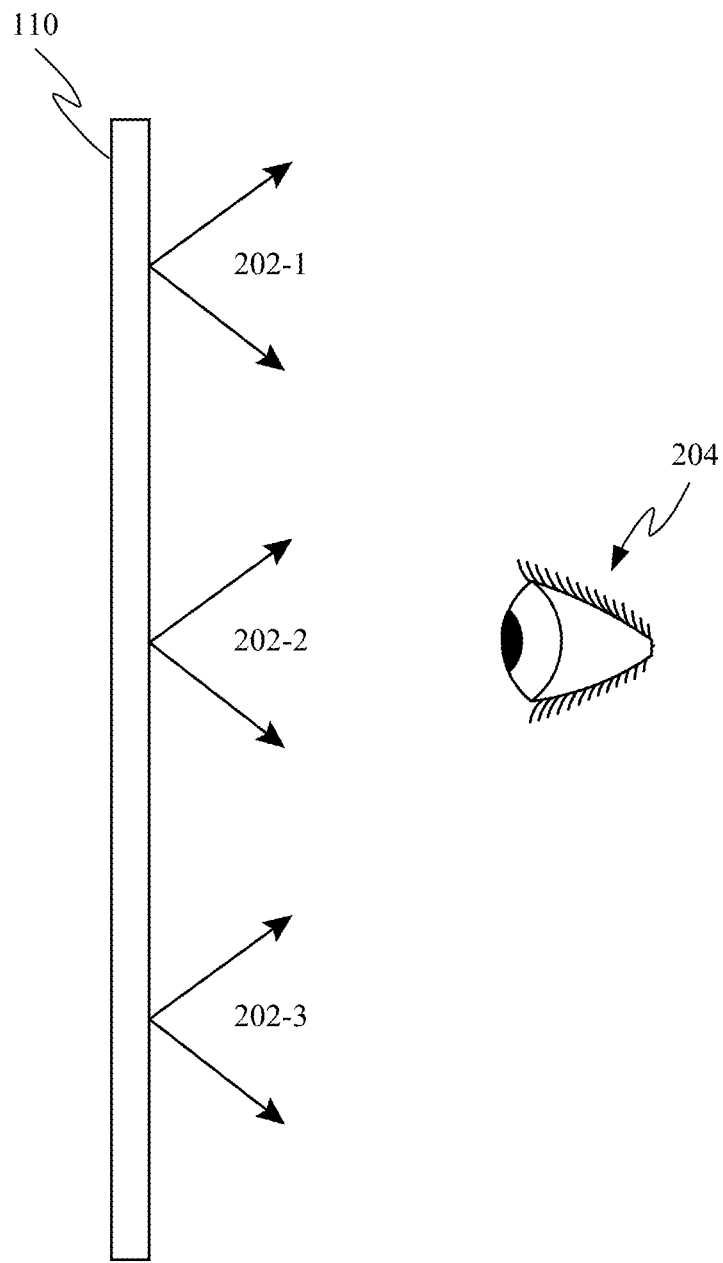
FIG. 2A shows a side view of a portion of a waveguide system that includes a unitary display region with an exit pupil expander configured to emit light oriented in one direction.

FIG. 2A shows a side view of eyepiece 110 that includes a unitary display region having an exit pupil expander configured to orient an image field 202 emitted from the exit pupil expander in one direction. The exit pupil expander can take the form of a diffraction grating having a uniform output configuration resulting in fixed output cones 202-1, 202-2 and 202-3 all being oriented in substantially the same direction. In the example of FIG. 2A, imagery displayed along the center region of the eyepiece 110 may reach a user's eye 204, while only a portion of the imagery displayed along a periphery of the eyepiece 110 may reach user's eye 204. More specifically, light exiting the exit pupil expander through fixed output cone 202-2 may reach the user's eye 204, but light exiting the pupil expander through fixed output cones 202-1 or 202-3 could go unobserved by user's eye 204. Indeed, even though the pixels of eyepiece 110 are associated with a large service angle, significant portions of the light making up the image field produced by waveguide system 110 may not reach eye 204 by virtue of the image field being oriented in a single direction. As such, the user may only be able to perceive a subset of the virtual content within the image field.

Figure 2B:
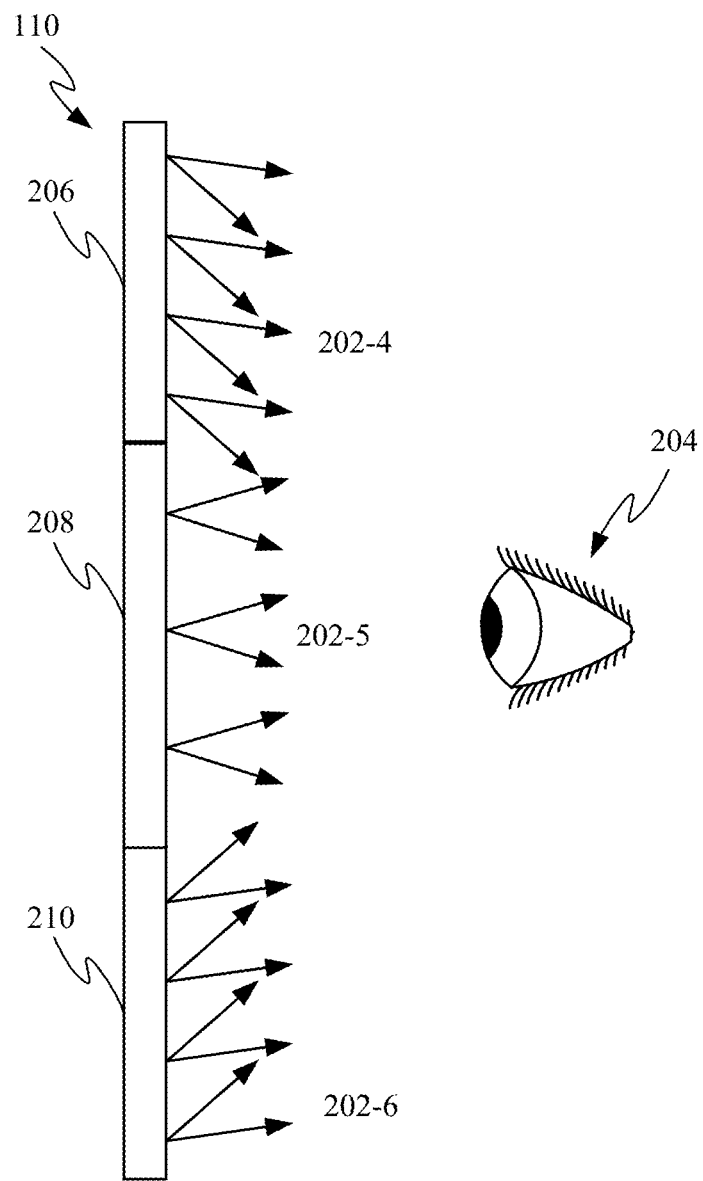
FIG. 2B shows a side view of a portion of a waveguide system that distributes light to multiple display regions configured to cooperatively present a large field of view to an eye of a user in accordance with the described embodiments.

FIG. 2B shows a side view of eyepiece 110 that includes multiple display regions 206, 208 and 210 having different configurations configured to cooperatively present a wide field of view. In some embodiments, the display regions can each include differently configured diffraction grating sections that project light rays in a different direction. For example, exemplary output cones 202-4 associated with display region 206 can represent light spreading out from discrete locations within display region 206. As depicted, each of output cones 202-4 is angled downward toward eye 204 at substantially the same angle. The group of output cones 202-4 represent an image field oriented towards eye 204. In particular, the light exiting the display regions through can be biased towards eye 204 so that substantially more light arrives at eye 204 than would otherwise arrive if all of the diffraction grating sections were oriented in the same direction. While the three depicted display regions are depicted as being similarly sized it should be appreciated that in some cases display region 208 can be substantially larger than display regions 206 and 210. For example, display region 208 could occupy a region corresponding to the maximum size viewable by eye 204. This could allow light rays emitted by display regions 206 and 210 to be oriented at a greater angle, which could further increase the effective field of view for eye 204.

Figure 3A:
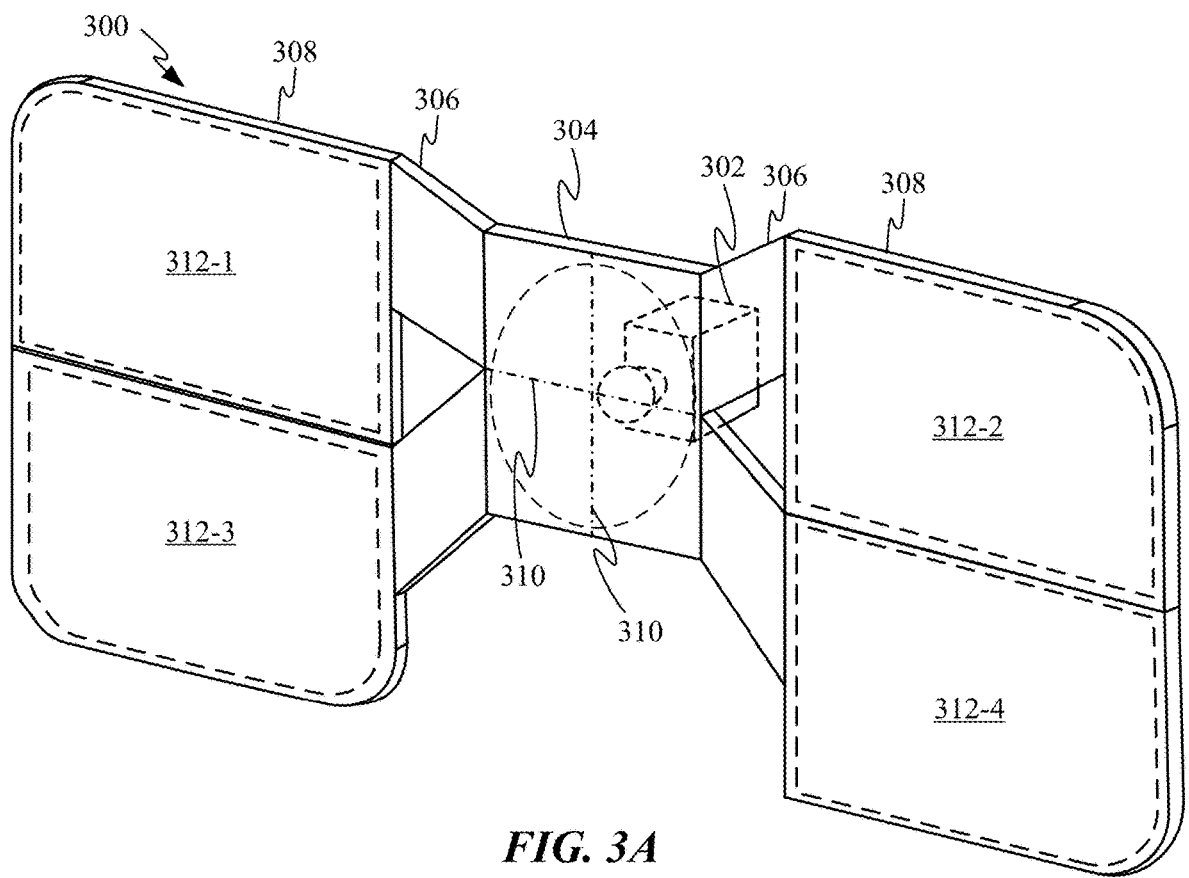
FIG. 3A shows a perspective view of another waveguide system configured to redirect light emitted by a projector towards a user's eyes in accordance with the described embodiments.

FIG. 3A shows a perspective view of a waveguide system 300 configured to direct light from a projector 302 into a user's eyes. A more detailed description of a waveguide system using diffractive optics is shown in greater detail in related application Ser. No. 15/849,527, which is incorporated by reference in its entirety and for all purposes. In some embodiments, projector 302 can be mounted to a display frame at position 108, as shown in FIG. 1. The waveguide system includes input coupling grating 304, orthogonal pupil expanders 306, and exit pupil expanders 308. Input coupling grating 304 can be configured to diffract light emitted by projector 302 about 90 degrees so that the light is oriented towards orthogonal pupil expanders 306. In some embodiments, input coupling grating 304 can include one or more light blocking element 310 configured to prevent light from inadvertently travelling to the wrong orthogonal pupil expander 306. Light blocking elements 310 can take the form of optically absorptive structures embedded within waveguide system 300. The absorptive structures can include absorptive particles (e.g. black paint), cavities, or distinct interfaces such as cut glass within the waveguide system. In some examples, light blocking elements 310 may include one or more photovoltaic elements for converting stray light into power that may be consumed by one or more other components of the wearable device. Orthogonal pupil expanders (OPEs) 306 can be distributed around input coupling grating 304 and direct the incoming light into various exit pupil expanders (EPEs) 308 that distribute light across display regions 312-1 to 312-4. In some embodiments, light blocking elements can also be positioned between adjacent orthogonal pupil expanders in order to prevent cross-talk between the OPEs. EPEs 308 then decouple the light out of waveguide system 300 and towards the eyes of a user.

Figure 3B:
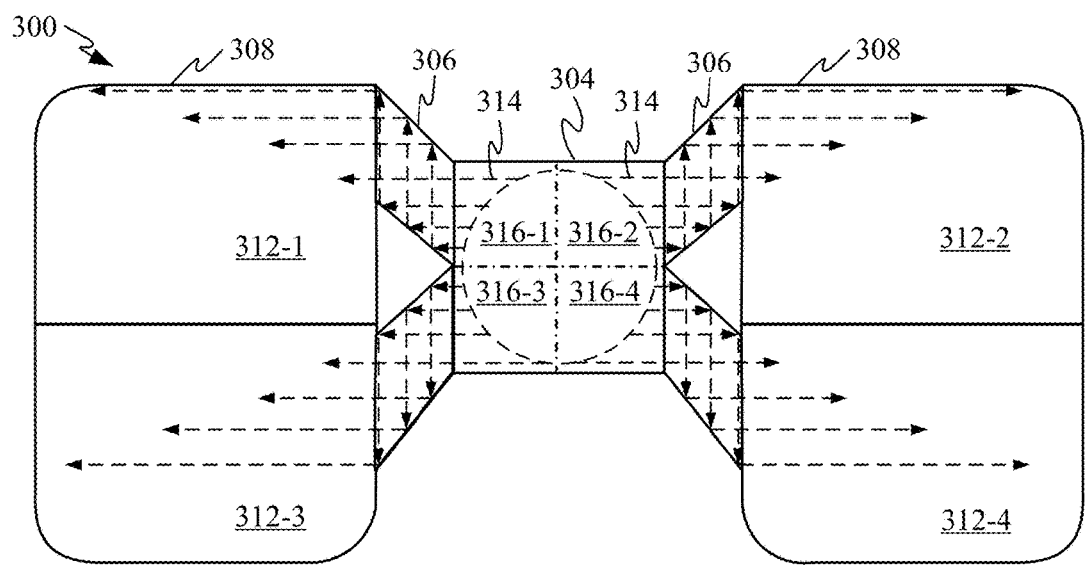
FIGS. 3B-3C show front views of waveguide systems and how light rays travel through orthogonal pupil expanders and into exit pupil expanders for display to a user in accordance with the described embodiments.

FIG. 3B shows a front view of waveguide system 300 and how light rays 314 travels into waveguide system 300 at one of input regions 316-1, 316-2, 316-3 or 316-4 of input coupling grating 304, then through a corresponding one of orthogonal pupil expanders 306 and finally into exit pupil expanders 308 for outcoupling towards the eyes of a user. In some embodiments, each input region is a physically-distinct optical element having its own input coupling grating. In these embodiments, light blocking elements 310 may not be embedded within waveguide system 300, but may instead be disposed between each of the four optical elements to which input regions 316-1, 316-2, 316-3 or 316-4 correspond. As depicted, light rays 314 undergo changes in direction as they travel through orthogonal pupil expanders 306. In some embodiments, at least some of light rays 314 received by input coupling grating 304 can be split or diffracted into multiple light rays 314 that are distributed to different portions of a display region as light rays 314 travel through waveguide system 300. For instance, the lower surface of the orthogonal pupil expander 306 that couples input region 316-1 to display region 312-1 may provide a beam-splitting function that allows some of the light rays 314 traveling from input region 316-1 to pass straight through into the exit pupil expander 308, while redirecting others toward the upper surface of the same orthogonal pupil expander 306. The light rays 314 that pass straight through into the exit pupil expander 308 may, in this example, be provided for output through the lower portion of display region 312-1. The upper surface of the same orthogonal pupil expander 306 may in turn include or function as a mirror so as to redirect the other light rays 314 into the exit pupil expander 308 for output through the upper portion of display region 312-1. The orthogonal pupil expanders 306 may function in a similar manner. While light rays 314 are depicted travelling in a straight line across display regions 312, it should be appreciated that in addition to decoupling the light rays from waveguide system 300, exit pupil expanders 308 can also include optical elements configured to distribute light rays 314 across display regions 312-1-312-4.

Figure 3C:
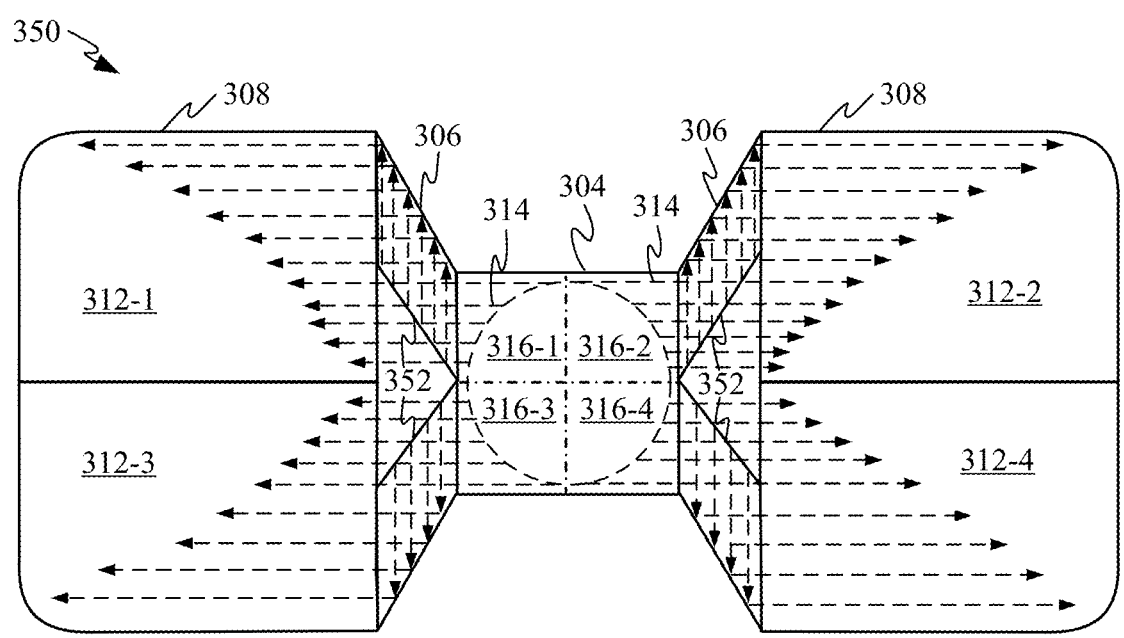
Figure 3D:
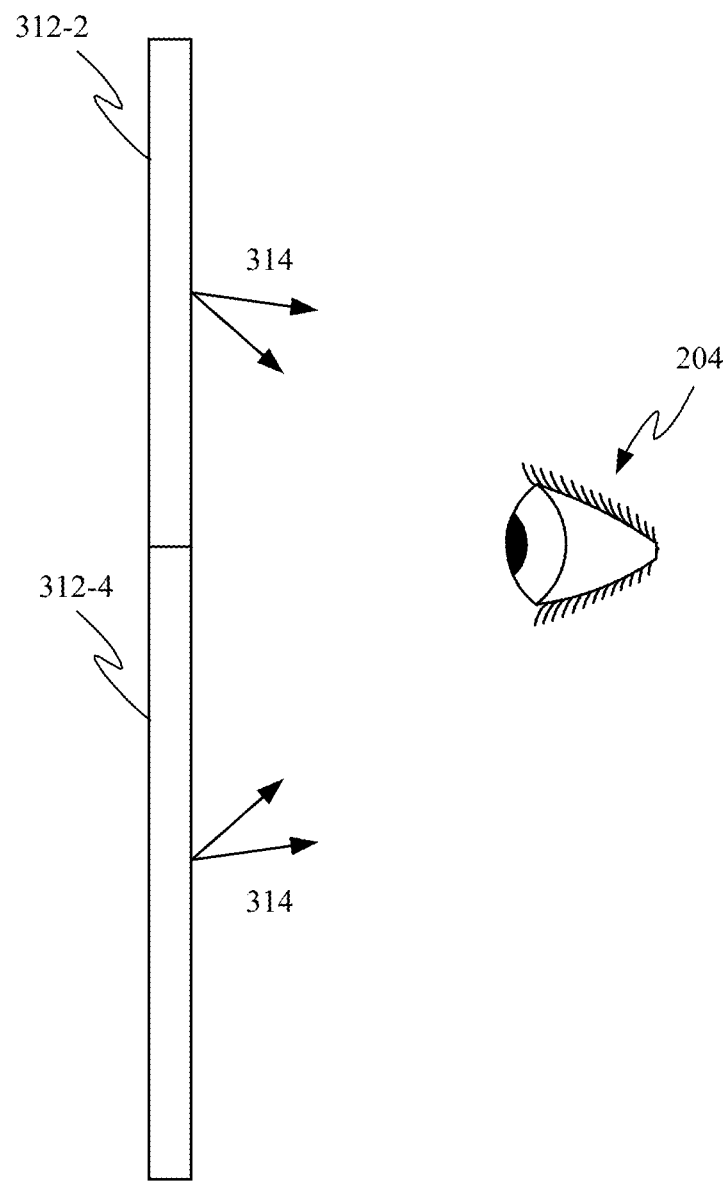
FIG. 3D shows how in some embodiments, light rays emitted from two different display regions and can be decoupled toward a user's eye in opposing directions

FIG. 3C shows waveguide system 350, which has similar features to waveguide system 300. In particular internal surfaces 352 of orthogonal pupil expanders 306 includes translucent sidewalls which allow some of light 314 to leave orthogonal pupil expander 306 and then enter back into one of display regions 312. In some embodiments, internal surfaces 352 could be polarized to allow only those portions of light rays 314 polarized in the correct orientation through while keeping other portions of light rays 314 within orthogonal pupil expanders 306. FIG. 3D shows how in some embodiments, input coupling grating 304 is shifted down to be centered within light rays 314 emitted from two different display regions 312-2 and 312-4 can be decoupled toward eye 204 by being decoupled from display regions 312 in opposing directions.

Figure 4:
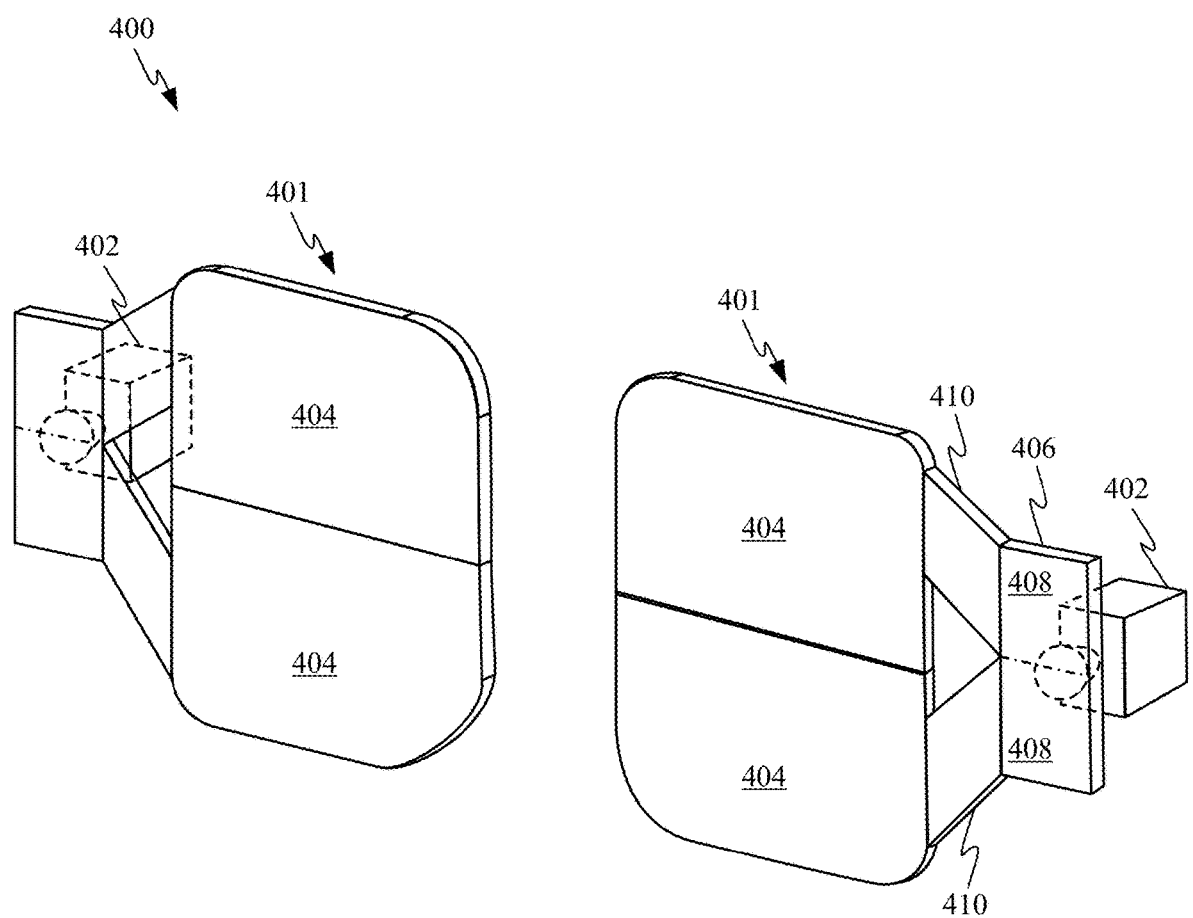
FIG. 4 shows a perspective view of another waveguide system that includes two eyepieces where each eyepiece includes two distinct display regions in accordance with the described embodiments.

FIG. 4 shows a perspective view of waveguide system 400 having two eyepieces 401. Waveguide system 400 includes two projectors 402 disposed at positions 104 (see FIG. 1). Each projector 402 can be configured to distribute light to two distinct display regions 404 of each eyepiece 401. The virtual content emitted by projectors 402 can be synchronized so that the virtual content observed by the user stays in sync. Routing of the light emitted by projectors 402 can be done in similar ways as the light rays depicted in FIG. 3B. For example, input coupling grating 406 is depicted including two separate input regions 408 designed to redirect light into two separate orthogonal pupil expanders 410, which direct incoming light into exit pupil expanders disposed within each of display regions 404.

Figure 5A:
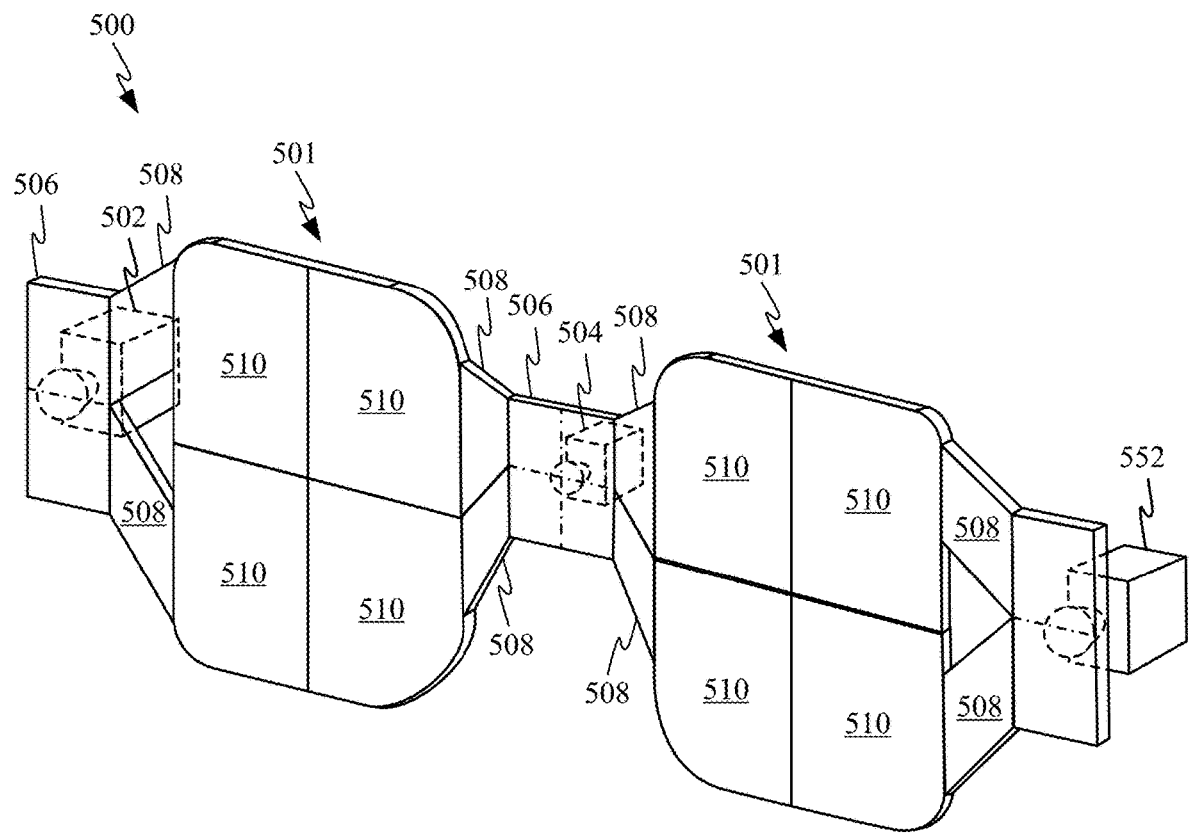
FIG. 5A shows a perspective view of another waveguide system in accordance with the described embodiments.

FIG. 5A shows a perspective view of waveguide system 500. Waveguide system 500 can be configured to distribute projected light into four distinct display regions for each of eyepieces 501. This can be accomplished by projecting light into waveguide system 500 using both lateral projectors 502 and central projector 504, disposed at positions 104 and 108 (see FIG. 1), respectively. Light from each projector is received and distributed by an input coupling grating 506 and orthogonal pupil expander 508 to a corresponding display region 510. Exit pupil expanders disposed within each of display regions 510 can be configured to bias the projected light both vertically and horizontally towards a position corresponding to the position of the eyes of a user. Horizontal biasing can be particularly helpful in expanding a user's total effective field of view since a user's horizontal field of view tends to be wider than the vertical field of view.

Figure 5B:
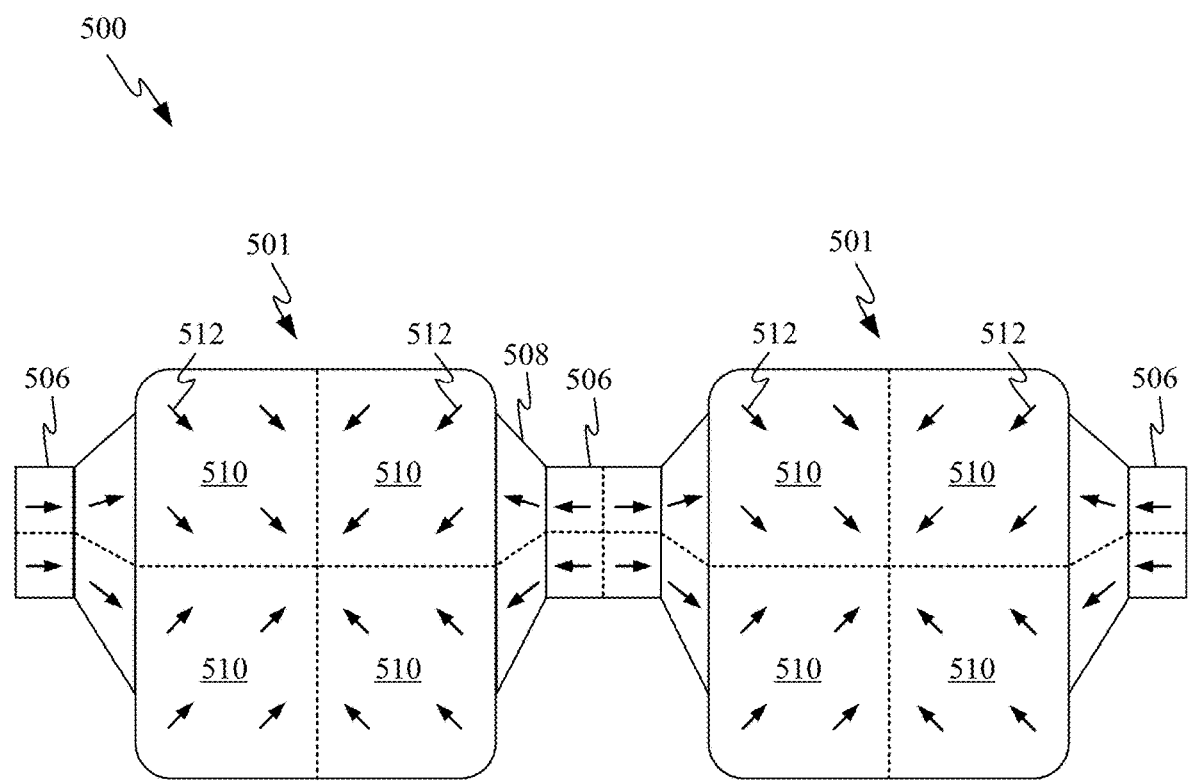
FIG. 5B shows how light rays within each display region can be biased towards a central region of a respective eyepiece to further improve the level of immersion felt by a user of a display device utilizing a waveguide system in accordance with the described embodiments.

As shown in FIG. 5B, light rays 512 within each display region 510 can be biased towards a central region of a respective eyepiece 501 to further improve the level of immersion felt by a user of a display device utilizing waveguide system 500. In this way, vertical components of light rays 512 positioned on respective upper and lower sides of eyepieces 501 are oriented in opposing directions. Similarly, light rays 512 positioned on respective left and right sides of one of eyepieces 501 have opposing horizontal components. While the depicted embodiment shows each of eyepieces 501 divided up into four equally sized display regions 510 by light blocking elements positioned along the dotted partitioning display regions 510, it should be appreciated that display regions 510 can also be divided up unevenly. For example, display regions 510 positioned closer to temples of an associated wearable display device can be wider or narrower than display regions 510 positioned closer to a bridge of the associated wearable display device.

Figure 5C:
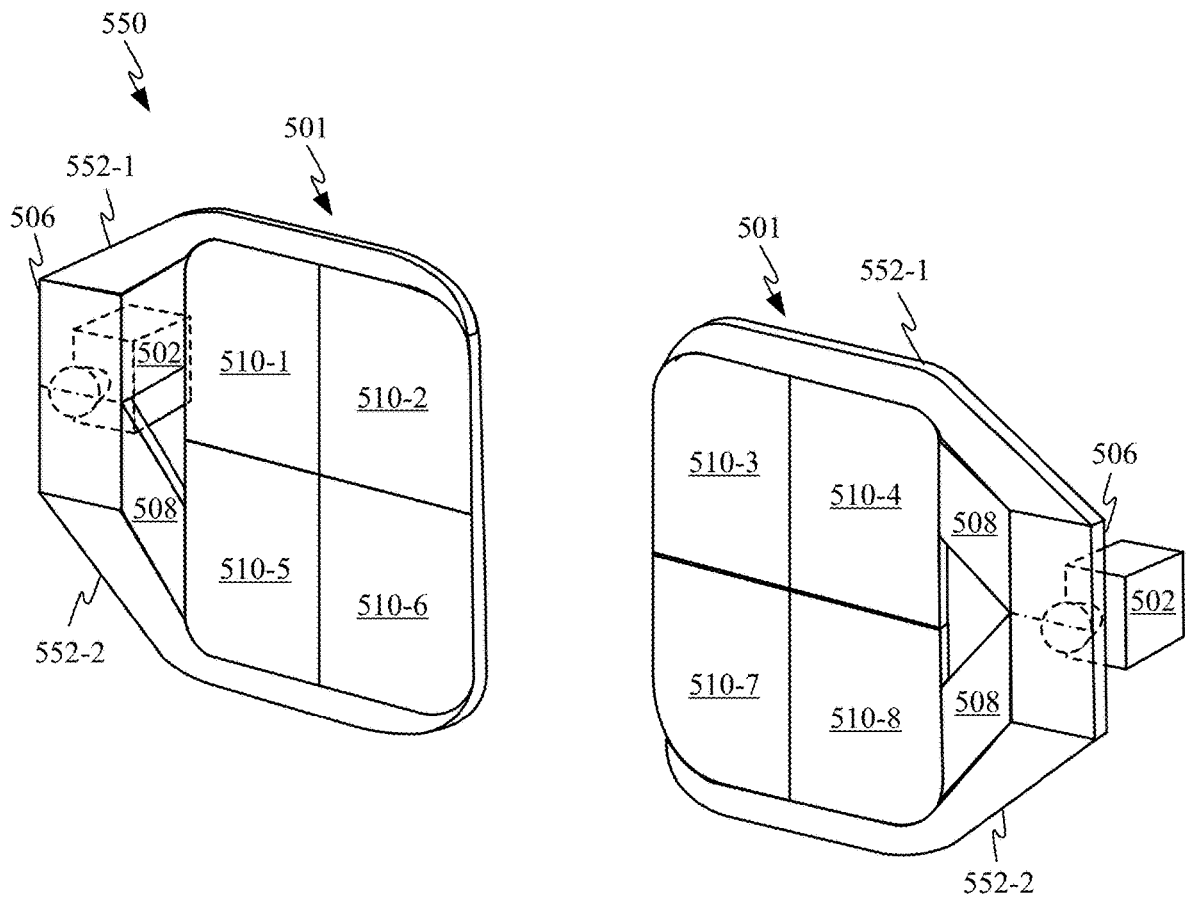
FIGS. 5C-5E show perspective and front views of another waveguide system in accordance with the described embodiments.
Figure 5D:
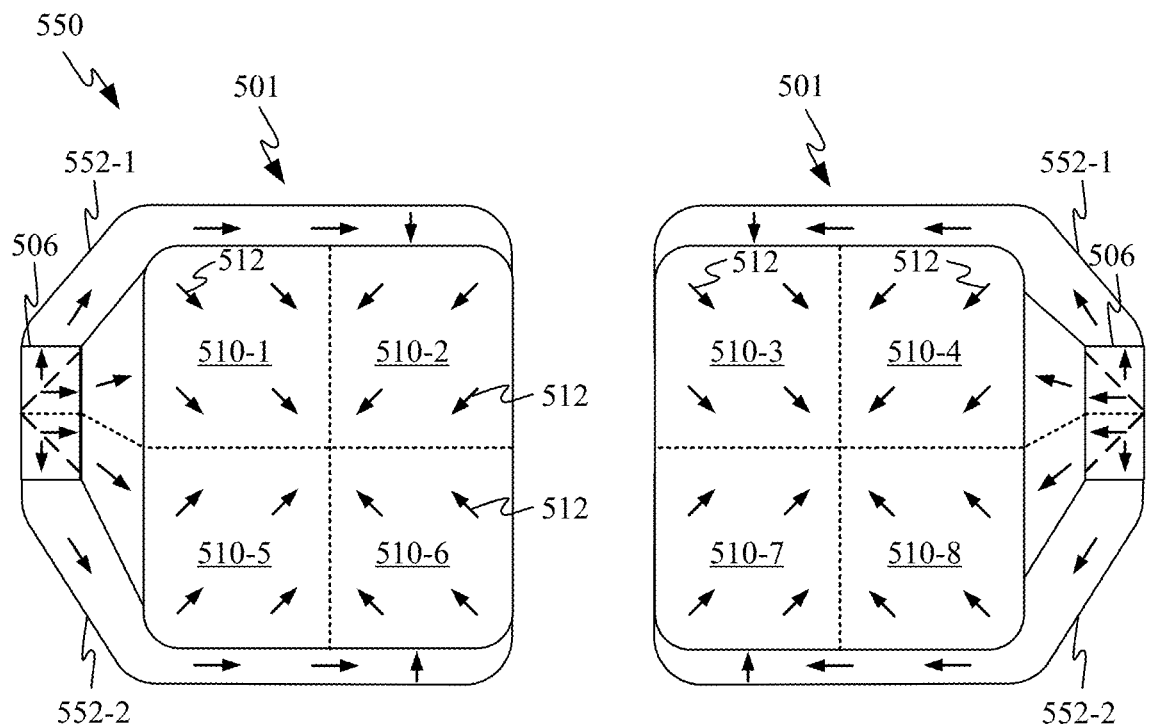

FIGS. 5C-5D show views of another waveguide system 550. FIG. 5C shows how waveguide system 550 includes two projectors 502 configured to project light into a respective input coupling grating 506 of eyepieces 501. FIG. 5C also shows how eyepieces 501 include upper orthogonal pupil expanders 552-1 and lower orthogonal pupil expanders 552-2, which are each configured to carry light received from one of input coupling gratings 506 into an exit pupil expander associated with one of display regions 510-2, 510-3, 510-6 or 510-7.

FIG. 5D shows how light travelling through waveguide system 550 is routed through diffractive optics of waveguide system 550. Waveguide system 550 includes four orthogonal pupil expanders arranged about each of input coupling gratings 506. Light received at input coupling gratings 506 are directed into one of the four orthogonal pupil expanders, which carry the light to a corresponding one of display regions 510. Upper orthogonal pupil expanders 514-1 direct light into an exit pupil expanders arranged within display regions 510-2 or 510-3. Lower orthogonal pupil expanders 514-2 distribute light into exit pupil expanders arranged within display regions 510-6 and 510-7, which shift light both vertically and horizontally.

Figure 5E:
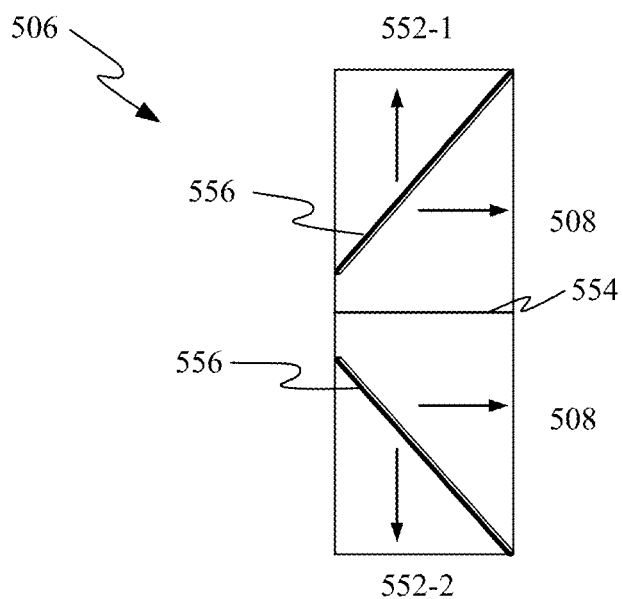

FIG. 5E shows a close up view of one of input coupling gratings 506. Input coupling grating 506 can include a light blocking element 554 that divides an upper region of input coupling grating 506 from a lower region of input coupling grating 506. In this way, any light projected into the upper region of input coupling grating 506 can be prevented from inadvertently passing into the lower region of input coupling rating 506. Input coupling grating 506 can also include beam splitters 556 configured to redirect light intended for orthogonal pupil expanders 508 from light intended for orthogonal pupil expanders 552. In some embodiments, beam splitters 556 can take the form of polarizing beam splitters. In such an embodiment, light emitted by projectors 502 can be polarized in different directions in order to direct the light towards the intended one of display regions 510. In some embodiments, beam splitters 556 can alternatively take the form of dichroic beam splitters, which could divide incoming light based on the wavelength of the incoming light.

Figure 6:
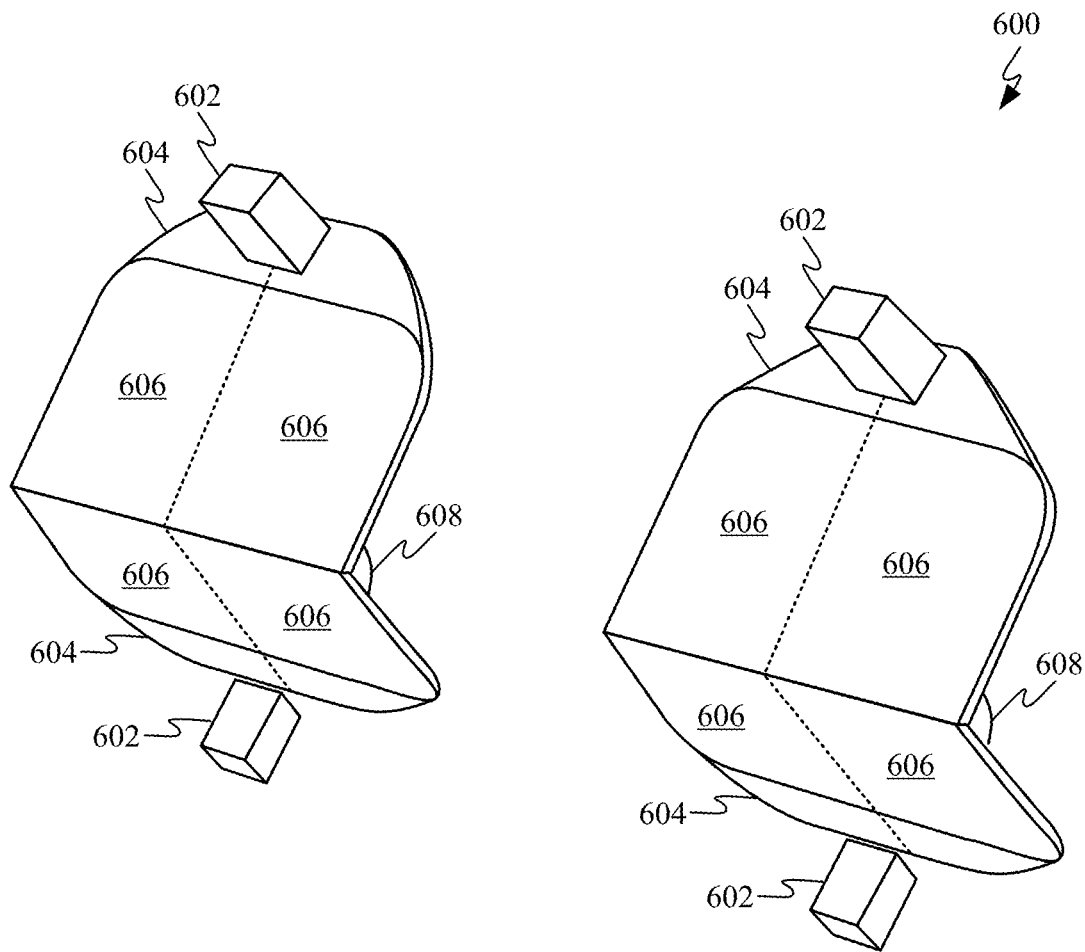
FIG. 6 shows a waveguide system having projectors positioned near upper and lower ends of the waveguide system in accordance with the described embodiments.

FIG. 6 shows a waveguide system 600 having projectors 602 positioned near upper and lower ends of waveguide system 600. In particular, projectors 602 at the upper ends of waveguide system 600 can be disposed at positions 112 (see FIG. 1). In this way, projectors 602 can project light into input coupling gratings 604, which can then be redirected into multiple different display regions 606. Display regions 606 can incorporate waveguides that include orthogonal pupil expanders and exit pupil expanders for redirecting the projected light into the eyes of a user, as described above in the previously described embodiments. It should be noted that waveguide system 600 could include only very minor or in some embodiments no orthogonal pupil expander at all due to the close proximity of projectors 602 to display regions 606. In this configuration, input coupling gratings 604 and exit pupil expanders associated with corresponding display regions 606 could cooperatively distribute light across display regions 606. In this way an amount of space taken up by waveguide system 600 can be substantially reduced on account of this configuration having reduced or non-existent orthogonal pupil expanders. It should be appreciated that an angle 608 between adjacent display regions can vary greatly. For example, in some embodiments, display regions 606 could be tilted relative to one another so that upper and lower display regions 606 are offset by an angle 608 that could vary between about 180 degrees and about 90 degrees. In some embodiments, by tilting display regions 606 upward and downward, the exit pupil expanders disposed within display regions 606 can have substantially the same design. In general, both angles 608 will be substantially the same so that both eyes of a user can be presented with a similar viewing experience.

Figure 7:
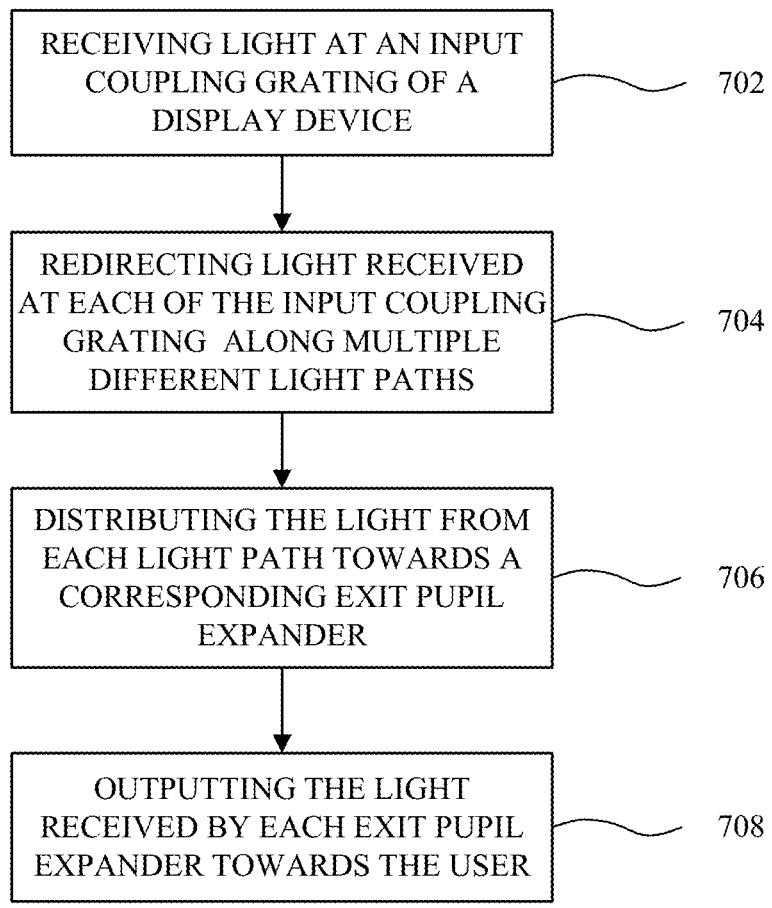
FIG. 7 shows a flow chart depicting a method for distributing projected light to the eyes in accordance with the described embodiments.

FIG. 7 shows a flow chart 700 describing a method for redirecting projected light to the eyes of a user of a display device. At 702, projected light is received by an input coupling grating of a display device. The input coupling grating can include multiple input regions. In some embodiments, the input regions can be separated by light blocking structures that prevent light received by one input region from inadvertently travelling along a waveguide associated with an adjacent input region. In other embodiments, the direction taken by the light entering the input coupling grating can be controlled by other means such as e.g. by a polarization beam splitter or by a dichroic beam splitter. At 704, the light received from each input region is directed along a corresponding waveguide that can include both an orthogonal pupil expander and an exit pupil expander. At 706, the projected light transmitted through the waveguides arrives at a corresponding exit pupil expanders. In some embodiments, the orthogonal pupil expander that transmit the light from the input region to the exit pupil expander repeatedly reflects the light at ninety degree angles in order to direct and distribute the light toward and across the exit pupil expanders. At 708, different exit pupil expanders are configured to output the projected light at different angles. The decoupling angle for light decoupled from each of the exit pupil expanders can be substantially the same.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wearable display device, comprising:
   a first projector configured to emit light associated with a first image;
   a first eyepiece comprising:
   a first input region configured to receive the light associated with a first portion of the first image and a second input region configured to receive the light associated with a second portion of the first image;
   a first light blocking structure positioned between the first input region and the second input region; and
   a first exit pupil expander including a first diffraction grating configured to output the light associated with the first portion of the first image and a second exit pupil expander including a second diffraction grating configured to output the light associated with the second portion of the first image;
   a second projector configured to emit light associated with a second image; and
   a second eyepiece comprising:
   a third input region configured to receive the light associated with a first portion of the second image and a fourth input region configured to receive the light associated with a second portion of the second image;
   a second light blocking structure positioned between the third input region and the fourth input region; and
   a third exit pupil expander including a third diffraction grating configured to output the light associated with the first portion of the second image and a fourth exit pupil expander including a fourth diffraction grating configured to output the light associated with the second portion of the second image;
   wherein the first exit pupil expander and the third exit pupil expander are disposed between the first input region and the third input region.

2. The wearable display device of claim 1, wherein the first exit pupil expander is configured to output the light associated with the first portion of the first image toward a first eye of a user at a first angle and the second exit pupil expander is configured to output the light associated with the second portion of the first image toward the first eye of the user at a second angle, and wherein the first angle is different than the second angle.

3. The wearable display device of claim 2, wherein the third exit pupil expander is configured to output the light associated with the first portion of the second image toward a second eye of the user at a third angle and the fourth exit pupil expander is configured to output the light associated with the second portion of the second image toward the second eye of the user at a fourth angle, and wherein the third angle is different than the fourth angle.

4. The wearable display device of claim 3, wherein the first angle, the second angle, the third angle, and the fourth angle are different.

5. The wearable display device of claim 1, wherein the first eyepiece further comprises a first input coupling grating that includes the first input region and the second input region, and wherein the second eyepiece further comprises a second input coupling grating that includes the third input region and the fourth input region.

6. The wearable display device of claim 1, further comprising:
   a frame defining a first opening sized to support the first eyepiece and a second opening sized to support the second eyepiece.

7. The wearable display device of claim 1, wherein:
   the first eyepiece further comprises:
   a first orthogonal pupil expander configured to redirect the light associated with the first portion of the first image and a second orthogonal pupil expander configured to redirect the light associated with the second portion of the first image; and the second eyepiece further comprises:
a third orthogonal pupil expander configured to redirect the light associated with the first portion of the second image and a fourth orthogonal pupil expander configured to redirect the light associated with the second portion of the second image.

8. A method of operating a wearable display device, composing:
emitting, at a first projector, light associated with a first image;
receiving, at a first input region of a first eyepiece, the light associated with a first portion of the first image;
receiving, at a second input region of the first eyepiece, the light associated with a second portion of the first image, wherein the first eyepiece further comprises a first light blocking structure positioned between the first input region and the second input region;
outputting, at a first exit pupil expander of the first eyepiece and by impingement from a first diffraction grating of the first exit pupil expander, the light associated with the first portion of the first image;
outputting, at a second exit pupil expander of the first eyepiece and by impingement from a second diffraction grating of the second exit pupil expander, the light associated with the second portion of the first image;
emitting, at a second projector, light associated with a second image;
receiving, at a third input region of a second eyepiece, the light associated with a first portion of the second image;
receiving, at a fourth input region of the second eyepiece, the light associated with a second portion of the second image, wherein the second eyepiece further comprises a second light blocking structure positioned between the third input region and the fourth input region;
outputting, at a third exit pupil expander of the second eyepiece and by impingement from a third diffraction grating of the third exit pupil expander, the light associated with the first portion of the second image; and
outputting, at a fourth exit pupil expander of the second eyepiece and by impingement from a fourth diffraction grating of the fourth exit pupil expander, the light associated with the second portion of the second image;

wherein the first exit pupil expander and the third exit pupil expander are disposed between the first input region and the third input region.

9. The method of claim 8, wherein the first exit pupil expander is configured to output the light associated with the first portion of the first image toward a first eye of a user at a first angle and the second exit pupil expander is configured to output the light associated with the second portion of the first image toward the first eye of the user at a second angle, and wherein the first angle is different than the second angle.

10. The method of claim 9, wherein the third exit pupil expander is configured to output the light associated with the first portion of the second image toward a second eye of the user at a third angle and the fourth exit pupil expander is configured to output the light associated with the second portion of the second image toward the second eye of the user at a fourth angle, and wherein the third angle is different than the fourth angle.

11. The method of claim 10, wherein the first angle, the second angle, the third angle, and the fourth angle are different.

12. The method of claim 8, wherein the first eyepiece further comprises a first input coupling grating that includes the first input region and the second input region, and wherein the second eyepiece further comprises a second input coupling grating that includes the third input region and the fourth input region.

13. The method of claim 8, wherein the wearable display device further comprises a frame defining a first opening sized to support the first eyepiece and a second opening sized to support the second eyepiece.

14. The method of claim 8, further comprising:
redirecting, at a first orthogonal pupil expander of the first eyepiece, the light associated with the first portion of the first image;
redirecting, at a second orthogonal pupil expander of the first eyepiece, the light associated with the second portion of the first image;
redirecting, at a third orthogonal pupil expander of the second eyepiece, the light associated with the first portion of the second image; and
redirecting, at a fourth orthogonal pupil expander of the second eyepiece, the light associated with the second portion of the second image.

\* \* \* \* \*